United States Patent Office 3,642,861
Patented Feb. 15, 1972

---

3,642,861
HYDRAZONE DERIVATIVES OF BENZOYL CYANIDES
Werner Meiser, Wuppertal-Elberfeld, Ludwig Eue, Cologne-Stammheim, Helmuth Hack, Cologne-Buchheim, Helmut Timmler, Wuppertal-Vohwinkel, and Richard Wegler, Leverkusen, Germany, assignors to Farbenfabriken Bayer Aktiengesellschaft, Leverkusen, Germany
No Drawing. Filed May 23, 1969, Ser. No. 827,159
Claims priority, application Germany, May 30, 1968,
P 17 68 574.4
Int. Cl. A01n 9/12, 9/20; C07c 121/78
U.S. Cl. 260—465 E      10 Claims

ABSTRACT OF THE DISCLOSURE

Hydrazone derivatives of benzoyl cyanides, i.e. (optionally chloro and alkyl substituted)-benzoyl cyanide-[$N^1$-alkyl-$N^2$-(alkyl and alkenyl)-amidino]-hydrazones and (optionally chloro and alkyl substituted)-benzoyl cyanide-1-(2,3-dialkyl- and -1-(2-alkenyl-3-alkyl isothioureido)-imines, which possess herbicidal properties, and which may be produced by conventional methods.

---

The present invention relates to and has for its objects the provision for particular new hydrazone derivatives of benzoyl cyanides, i.e. (optionally chloro and alkyl substituted)-benzoyl cynadide-[$N^1$-alkyl-$N^2$-(alkyl and alkenyl)-amidino]-hydrazones and (optionally chloro and alkyl substituted)-benzoyl cyanide-1-(2,3-dialkyl- and -1-(2-alkenyl-3-alkyl-isothioureido)imines, which possess valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is known that 1,3,5-triazines can be used for the control of weeds (see Belgian Pat. 540,590). One of these compounds, 2,6-di-(mono-ethyl-amino)-4-chloro-1,3,5-triazine (A), has attained considerable practical importance.

It has now been found, in accordance with the present invention, that the particular new hydrazone derivatives of benzoyl cyanides, i.e. benzoyl cyanide-hydrazones, of the formula $$R_n-\underset{}{\underset{}{C_6H_4}}-\overset{CN}{\underset{}{C}}=N-NH-\overset{N-R_1}{\underset{}{C}}-X-R_2 \quad (I)$$

in which:

R is chloro or alkyl of 1–3 carbon atoms,
n is 0, 1 or 2,
$R_1$ is alkyl of 1–4 carbon atoms,
$R_2$ is alkyl of 1–4 carbon atoms or alkenyl of 3–4 carbon atoms,
X is sulfur or —$NR_3$—, and
$R_3$ is hydrogen or alkyl of 1–4 carbon atoms, exhibit strong herbicidal, in particular selective herbicidal, properties.

It has been furthermore found, in accordance with the present invention, that a process for the production of the particular new compounds of Formula I above may be provided, which comprises reacting (a) a benzoyl cyanide of the formula $$R_n-\underset{}{\underset{}{C_6H_4}}-\overset{CN}{\underset{}{C}}=O \quad (II)$$

in which:

R and n are the same as defined above, with a hydrazine derivative of the formula $$H_2N-NH-\overset{N-R_1}{\underset{}{C}}-X-Y_2 \quad (III)$$

in which:

$R_1$ and X are the same as defined above, and
$Y_2$ is hydrogen or $R_2$, or (b) if $Y_2$ is hydrogen, alkylating the reaction product to convert $Y_2$ to $R_2$.

The process may of course comprise the preparation of one compound followed by its alkylation to give a compound according to the invention as the artisan will appreciate. For example, there may first be produced a compound containing hydrogen as $Y_2$ and as $R_3$, and both these hydrogens may be alkylated to give a compound containing $R_2$ and in which $R_3$ is a lower alkyl radical of the foregoing type.

Alkylation where required may be carried out by means of any of the well-known alkylating agents in the conventional manner.

It is very surprising that the particular new compounds of the present invention exhibit a stronger herbicidal potency than the 1,3,5-triazines previously known. Therefore, the instant compounds represent a valuable contribution to the art.

The course of the one-step reaction (which is preferably used) for the preparation of particular new compounds according to the present invention can be illustrated by the following formula scheme:

$$\underset{(IIa)}{\underset{}{C_6H_5}}-\overset{CN}{\underset{}{C}}=O + H_2N-NH-\overset{NCH_3}{\underset{}{C}}-SCH_3 \underset{(IIIa)}{\longrightarrow}$$

$$\underset{(I_1)}{\underset{}{C_6H_5}}-\overset{CN}{\underset{}{C}}=N-NH-\overset{NCH_3}{\underset{}{C}}-SCH_3$$

Advantageously, in accordance with the present invention, in the foregoing formulae:

R represents chloro, or lower alkyl hydrocarbon of 1–3 carbon atoms such as methyl, ethyl, n- and iso-propyl, especially $C_{1-2}$ alkyl, and more especially methyl;
n represents a whole number from 0–2, preferably 0; such that R may be in 2-, 3- or 4-position, especially in 4-position, on the phenyl nucleus;
$R_1$ represents lower alkyl hydrocarbon of 1–4 carbon atoms such as methyl, ethyl, n- and iso-propyl, n-, iso-, sec.- and tert.-butyl, and the like, especially $C_{1-3}$ or $C_{1-2}$ alkyl, and more especially methyl;
$R_2$ represents lower alkyl hydrocarbon of 1–4 carbon atoms such as methyl to tert.-butyl inclusive, and the like, as defined above, especially $C_{1-3}$ or $C_{1-2}$ alkyl, and more especially methyl; or lower alkenyl hydrocarbon of 3–4 carbon atoms such as α-, β- and γ-allyl, but-1,2 and 3-enyl, and the like, especially $C_3$ alkenyl, and more especially α-allyl;
X represents sulfur, or —N—$R_3$—;

$R_3$ represents hydrogen, or lower alkyl hydrocarbon of 1–4 carbon atoms such as methyl to tert.-butyl inclusive, and the like, as defined above, especially $C_{1-3}$ or $C_{1-2}$ alkyl, and more especially methyl; and
$Y_2$ represents hydrogen, or $R_2$ as defined above.

Preferably, R is chloro; or $C_{1-3}$ or $C_{1-2}$ alkyl, especially methyl; $n$ is 0 or 1; $R_1$ is $C_{1-4}$ or $C_{1-3}$ or $C_{1-2}$ alkyl, especially methyl; X is sulfur; or —N—$R_3$—; $R_2$ is $C_{1-4}$ or $C_{1-3}$ or $C_{1-2}$ alkyl, especially methyl, when X is sulfur; whereas $R_2$ is $C_{1-4}$ or $C_{1-3}$ or $C_{1-2}$ alkyl, especially methyl; or $C_{3-4}$ alkenyl, especially $C_3$ alkenyl, and more especially α-allyl, when X is —N—$R_3$—; and $R_3$ is hydrogen; or $C_{1-4}$ or $C_{1-3}$ or $C_{1-2}$ alkyl, especially methyl.

The starting materials are clearly characterized by Formulae II and III above.

The starting materials required are of course already known.

The production reaction may be carried out optionally in the presence of a solvent (this term includes mere diluents). Preferred solvents include water and inert organic solvents, particularly those which are miscible with water. These include alcohols, such as methanol, ethanol and isopropanol; ethers, such as dioxan and tetrahydrofuran; and highly polar solvents, such as di-methyl formamide, dimethyl sulfoxide and acetonitrile; and the like.

The reaction may be accelerated, if desired, by the addition of an acid, for example nitric acid, hydrochloric acid or sulfuric acid.

The reaction temperatures which may be used can be varied within a fairly wide range. In general, the reaction is carried out as substantially between about —20 to 100° C., preferably between about 0 to 20° C.

Equimolar amounts of the starting materials are expediently used. The hydrazone derivative may, however, be used in excess. The addition of an acid is not necessary, but often expedient. Catalytic amounts, or greater amounts, of acid may be readily used.

The working up of the reaction mixture may be effected in the usual manner.

When $Y_2$ is hydrogen in the starting compound of Formula III above, and it is desired to produce as final product a compound of Formula I above, or when $Y_2$ and $R_3$ are both hydrogen in the compound of Formula III and it is desired to produce as final product a compound of Formula I in which $R_3$ is lower aliphatic, e.g. alkyl, then the process involves two steps. The first step (a) may be carried out as described above. It is then followed by an alkylation step (b).

The alkylation step (b) may be carried out in customary manner with an alkyl halide in which the alkyl radical corresponds to $R_3$, for example methyl iodide, ethyl iodide, methyl bromide and ethyl chloride, or with dialkylsulfuric acid, such as dimethylsulfuric acid, preferably in the neutral or acidic range in the presence of solvents, such as water, methanol and ethanol, at a temperature from 0 to 100° C.

Advantageously, the active compounds according to the present invention exhibit a strong herbicidal potency and can therefore be used as weed killer. By weeds are meant in the broadest sense all plants which grow in places where they are not desired. Whether the active compounds according to the invention act as total or selective herbicidal agents depends on the amount applied, as the artisan will appreciate.

The active compounds according to the present invention can be used for example in the case of the following plants: dicotyledons, such as mustard (Sinapis), cress (Lepidium), cleaver (Galium), common chickweed (Stellaria), mayweed (Matricaria), smallflower Galinsoga (Gallinsoga), fathen (Chenopodium), stinging nettle (Urtica), groundsel (Senecio), cotton (Grossypium), beets (Beta), carrots (Daucus), beans (Phaseolus), potatoes (Solanum), coffee (Coffea); monocotyledons, such as timothy (phleum), blue grass (poa), fescue (Festuca), goosegrass (Elusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum); and the like.

The new active compounds according to the present invention are preferably used as selective herbicides. Such compounds exhibit a good selectivity when applied before and after emergence in cotton, beans, and cereals, such as what and maize. The instant compounds are particularly effective against Echinochloa, a weed which is difficult to control.

The active compounds according to the instant invention can be utilized, if desired, in the form of the usual formulations or compositions with conventional inert pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used is diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chloro-benzenes), paraffins (e.g. petroleum fractions), chlorinated aliphatic hydrocarbons (e.g. methylene chloride, etc.), alcohols (e.g. methanol, ethanol, propanol, butanol, etc.), ethers, ether-alcohols (e.g. glycol monomethyl ether, etc.), amines (e.g. ethanol-amine, etc.), amides (e.g. dimethyl, formaide, etc.), sulfoxides (e.g., dimethyl sulfoxide, etc.) ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, or fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application (especially for post-emergency application) generally contemplate those in which the active compound is present (especially in aqueous preparations) in an amount substantially between about 0.005–

0.5%, preferably 0.008–0.1% by weight of the mixture. Thus, the persent invention contemplates overall compositions which comprise mixtures of a conventional herbicidally inert dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, eg.g. a surface-active agents, such as an emulsifying agent and/or a dispersing agent, and an amount of the active compound which is effective for the purpose in question and which is generally between about 0.005–95%, and preferably 0.008–95%, by weight of the mixture.

In particular, the amount of active compound per unit area varies according to the purpose intended and the mode of application. In general, substantially between about 0.25–20 kg. of active compound per hectare are applied, preferably between about 0.5–10 kg. per hectare.

The active compounds can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

While the active compounds can be used according to the pre-emergence method, they are also particularly effective when used according to the post-emergence method.

Furthermore, the present invention contemplates methods of selectively killing, combating or controlling undesired plants, e.g. weeds and the like, which comprise applying to at least one of (a) such weeds and (b) their habitat, i.e. the locus to be protected, a herbicidally effective or toxic amount of the particular active compound of the invention alone or together with a carrier vehicle as noted above. The instant formulations or compositions are applied in the usual manner for example by spraying, atomizing, scattering, dusting, watering sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application and may be varied within a fairly wide range depending upon the weather conditions, the purpose for which the active compound is used, e.g. as total or only selective herbicidal effect, and the plants which are to be controlled or protected. Therefore, in special cases, it is possible to go above or below the aforementioned concentration ranges.

The following examples illustrate, without limitation, the herbicidal activity of the particular active compounds of the present invention.

EXAMPLE 1

Pre-emergence test

Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is added thereto, and the resulting concentrate is then diluted with water to the desired final concentration.

Seed of the test plants are sown in normal soil and, after 24 hours, watered with the given active compound preparation. It is expedient to keep constant the amount of water per unit area. The concentration of the active compound in the preparation is of no importance, only the amount of active compound applied per unit area being decisive. After three weeks, the degree of damage to the test plants is determined and characterized by the values 0–5, which have the following meaning:

0—no effect
1—slight damage or delay in growth
2—marked damage or inhibition of growth
3—heavy damage and only deficient development or only 50% emerged
4—plants partially destroyed after germination or only 25% emerged
5—plants completely dead or not emerged.

The particular active compounds tested, the amounts applied and the results can be seen from the following Table 1.

TABLE 1.—PRE-EMERGENCE TEST

| Active Compound | Active compound applied in kg./hectare | Echino-chloa | Cheno-podium | Sina-pis | Galin-soga | Stel-laria | Matri-caria | Cotton | Wheat | Maize |
|---|---|---|---|---|---|---|---|---|---|---|
| (A) [structure: Cl-substituted triazine with NHC₂H₅ groups] (known) | 5 | 3–4 | 5 | 5 | 5 | 5 | 5 | 5 | 4 | 0 |
| | 2.5 | 3 | 5 | 5 | 5 | 5 | 5 | 4 | 3 | 0 |
| | 1.25 | 2 | 5 | 5 | 4–5 | 5 | 4 | 3 | 2 | 0 |
| (I₂) [structure: phenyl-C(CN)=N-NH-C(N-CH₃)-SCH₃] | 5 | 5 | 5 | 5 | 5 | 5 | 5 | 0 | 2 | 2 |
| | 2.5 | 4 | 5 | 4 | 5 | 5 | 5 | 0 | 1 | 0 |
| | 1.25 | 3 | 4 | 3 | 5 | 5 | 5 | 0 | 0 | 0 |

EXAMPLE 2

Post-emergence test

Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is added thereto, and the resulting concentrate is then diluted with water to the desired final concentration.

Test plants which have a height of about 5-15 cm. are sprayed with the given active compound preparation until just dew moist. After three weeks, the degree of damage to the plants is determined and characterized by the values 0-5, which have the following meaning:

0—no effect
1—a few slightly burnt spots
2—marked damage to leaves
3—some leaves and parts of stalks partially dead
4—plant partially destroyed
5—plant completely dead.

The particular active compounds tested, their concentrations and the results obtained can be seen from the following Table 2.

EXAMPLE 4

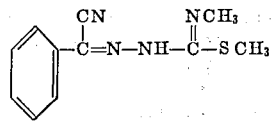

(1₄)

24.7 g. H₂N—NH—C=NCH₃·HI (1/10 mol) are neutralized
       |
       SCH₃ with 50 ml. of 2 N sodium hydroxide below 0° C.

200 ml. of 4 N nitric acid are then added at about 0° C. After this, 13.1 g. benzoyl cyanide (1/10 mol) in 31 ml.

TABLE 2.—POST-EMERGENCE TEST

| Active Compound | Concentration [1] | Echino-chloa | Cheno-podium | Sina-pis | Galin-soga | Stel-laria | Urti-ca | Matri-caria | Cotton | Wheat | Beans |
|---|---|---|---|---|---|---|---|---|---|---|---|
| (A) ... (structure with Cl, triazine, NHC₂H₅) (known) | 0.1<br>0.05<br>0.025 | 4<br>3<br>2 | 5<br>5<br>4 | 5<br>5<br>5 | 4-5<br>4<br>3 | 5<br>5<br>5 | 5<br>3<br>2 | 5<br>5<br>4 | 1<br>0<br>0 | 4<br>2<br>1 | |
| (2₁) ... Ph-C(CN)=N—NH—C(=NCH₃)—NH—CH₃ | 0.1<br>0.05<br>0.025 | 5<br>4-5<br>3-4 | 5<br>5<br>5 | 5<br>5<br>5 | 5<br>5<br>5 | 5<br>5<br>4-5 | 5<br>5<br>5 | 5<br>4<br>3 | 5<br>5<br>5 | 4<br>4<br>3 | 5<br>5<br>4-5 |
| (3₁) ... Cl-Ph-C(CN)=N—NH—C(=NCH₃)—NH—CH₃ | 0.1<br>0.05<br>0.025 | 5<br>4<br>3 | 5<br>5<br>5 | 5<br>5<br>5 | 5<br>5<br>5 | 5<br>5<br>4 | 5<br>5<br>5 | 5<br>4-5<br>3 | 4-5<br>3<br>3 | 2<br>1<br>0 | 3<br>1<br>0 |
| (1₃) ... Ph-C(CN)=N—NH—C(=N-CH₃)—SCH₃ | 0.1<br>0.05<br>0.025 | 5<br>5<br>4 | 5<br>5<br>5 | 5<br>5<br>5 | 5<br>5<br>5 | 5<br>5<br>5 | 5<br>5<br>5 | 5<br>5<br>5 | 5<br>5<br>4 | 5<br>5<br>4 | 5<br>5<br>4 |

[1] Active compound in percent.

EXAMPLE 3

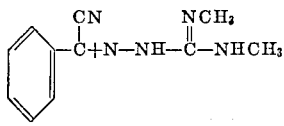

(2₂)

13.1 g. benzoyl cyanide are dissolved in 13.1 ml. dimethyl sulfoxide and added dropwise at about 15° C. to a suspension of 23 g. N¹,N²-dimethyl-amidino-hydrazine hydroiodide (prepared from methyl-thiosemicarbazide and methyl iodide and reaction with methyl amine) in 50 ml. of water and 100 ml. 4 N nitric acid. After stirring overnight, cooling is effected, followed by suction filtration and washing.

After digestion with sodium bicarbonate, benzoyl cyanide - [N¹ - methyl - N²-methyl-amidino]-hydrazone is obtained which, after drying, is recrystallized from ethyl acetate. M.P. 167° C.

dimethyl sulfoxide are added dropwise at about 0° C. The temperature is kept at about 0° C. for about a further 6 hours; cooling is then continued with running water for several hours. The precipitate is filtered off with suction and washed three times with water. After digestion with N solution of sodium hydroxide, the substance becomes yellow. It is filtered off with suction and washed free from alkali. After recrystallization from ether or benzene/petroleum ether, the above product of M.P. 140° C. is obtained.

EXAMPLE 5

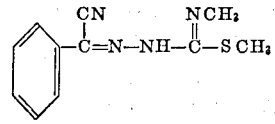

(1₅)

13.1 g. benzoyl cyanide in 13.1 ml. dimethyl sulfoxide are added dropwise at 0–5° C. to 10.5 g. methyl-thiosemicarbazide in 100 ml. 2 N nitric acid.

After stirring overnight and cooling with water, suction filtration is effected, followed by washing with water.

After drying, the product is recrystallized from methanol. The benzoyl cyanide-N³-methyl-thiosemicarbazone of M.P. 205° C. is obtained.

When this compound is methylated in neutral or acidic medium, the S-methyl derivative of the above formula of M.P. 140° C. is obtained, i.e. benzoyl cyanide-1-(2,3-dimethyl-isothioureido)-imine.

EXAMPLE 6

In analogy with the foregoing examples and in conformity with the general information given herein, the following substances are similarly prepared.

| Active compound | Physical constant, M.P., °C. |
|---|---|
| (4₁) [structure] | 172 |
| (5₁) [structure] | 148 |
| (6₁) [structure] | 165 |
| (3₂) [structure] | 186 |

These compounds can be designated, respectively:

(4₁) benzoyl cyanide-[N¹-methyl-N²,N²-dimethyl-amidino]-hydrazone;
(5₁) benzoyl cyanide-[N¹-methyl-N²-allyl-amidino]-hydrazone;
(6₁) 4-methyl-benzoyl cyanide-[N¹-methyl-N²-methyl-amidino]-hydrazone; and
(3₂) 4-chloro-benzoyl cyanide-[N¹-methyl-N²-methyl-amidino]-hydrazone.

It will be realized by the artisan that all of the foregoing compounds contemplated by the present invention possess the desired selective or total herbicidal properties, and especially the capability of selectively destroying weeds, as well as a comparatively low toxicity toward warm-blooded creatures and a concomitantly low phytotoxicity with respect to higher plants, enabling such compounds to be used with correspondingly favorable compatibility with warm-blooded creatures and higher plants for more effective control and/or elimination of weeds by selective application of such compounds to such weeds and/or their habitat. Nevertheless, the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention.

What is claimed is:

1. Benzoyl cyanide-hydrazone of the formula

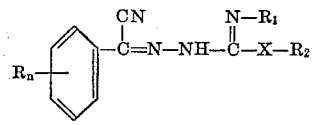

in which R is selected from the group consisting of chloro and alkyl of 1-3 carbon atoms, $n$ is a whole number from 0-2, $R_1$ is alkyl of 1-4 carbon atoms, $R_2$ is selected from the group consisting of alkyl of 1-4 carbon atoms and alkenyl of 3-4 carbon atoms, X is selected from the group consisting of sulfur and —NR₃—, and $R_3$ is selected from the group consisting of hydrogen and alkyl of 1-4 carbon atoms.

2. Compound according to claim 1 wherein R is selected from the group consisting of chloro and $C_{1-2}$ alkyl, $n$ is 0-1, $R_1$ is $C_{1-2}$ alkyl, $R_2$ is selected from the group consisting of $C_{1-2}$ alkyl and $C_3$ alkenyl, X is selected from the group consisting of sulfur and —NR₃—, and $R_3$ is selected from the group consisting of hydrogen and $C_{1-2}$ alkyl.

3. Compound according to claim 1 wherein $n$ is 0, $R_1$ is $C_{1-2}$ alkyl, $R_2$ is selected from the group consisting of $C_{1-2}$ alkyl and $C_3$ alkenyl, X is selected from the group consisting of sulfur and —NR₃—, and $R_3$ is selected the group consisting of hydrogen and $C_{1-2}$ alkyl.

4. Compound according to claim 1 wherein R is selected from the group consisting of chloro and $C_{1-2}$ alkyl, $n$ is 0-1, $R_1$ is $C_{1-2}$ alkyl, $R_2$ is selected from the group consisting of $C_{1-2}$ alkyl and $C_3$ alkenyl, X is —NR₃—, and $R_3$ is selected from the group consisting of hydrogen and $C_{1-2}$ alkyl.

5. Compound according to claim 1 wherein $n$ is 0, $R_1$ is $C_{1-2}$ alkyl, $R_2$ is $C_{1-2}$ alkyl, X is sulfur, and $R_3$ is hydrogen.

6. Compound according to claim 1 wherein such compound is benzoyl cyanide-1-(2,3-dimethyl-isothioureido)-imine of the formula

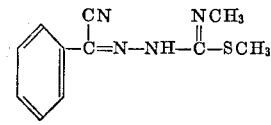

7. Compound according to claim 1 wherein such compound is benzoyl cyanide-[N¹,N²-dimethyl-amidino]-hydrazone of the formula

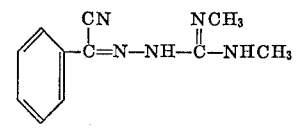

8. Compound according to claim 1 wherein such compound is 4-chloro-benzoyl cyanide-[N¹,N²-dimethyl-amidino]-hydrazone of the formula

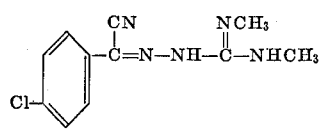

9. Compound according to claim 1 wherein such compound is benzoyl cyanide-[$N^1$-methyl-$N^2,N^2$-dimethyl-amidino]-hydrazone of the formula

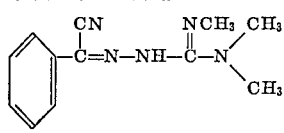

10. Compound according to claim 1 wherein such compound is benzoyl cyanide-[$N^1$-methyl-$N^2$-allyl-amidino]-hydrazone of the formula

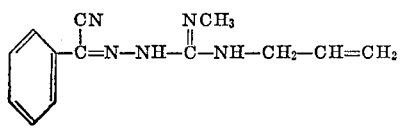

References Cited
UNITED STATES PATENTS

| 3,033,893 | 5/1962 | Morin et al. | 260—465 |
| 3,179,651 | 4/1965 | Stacey | 260—465 X |
| 3,483,246 | 12/1969 | Kaufman | 265—465 |

HENRY R. JILES, Primary Examiner

D. H. TORRENCE, Assistant Examiner

U.S. Cl. X.R.

71—98, 99, 105; 260—564 E, 564 F

Farben 1576-PF

UNITED STATES PATENT OFFICE
CERTIFICATE OF CORRECTION

Patent No. 3,642,861　　　　　Dated February 15, 1972

Inventor(s) Werner Meiser, Ludwig Eue, Helmuth Hack, Helmut Timmler, Richard Wegler It is certified that error appears in the above-identified patent and that said Letters Patent are hereby corrected as shown below:

Col. 3, line 72

"Grossypium"　　should be　　--Gossypium--

Col. 5, line 9

"agents"　　should be　　--agent--

Claim 3, line 4 after "selected"　　insert　　--from--

Signed and sealed this 11th day of July 1972.

(SEAL)
Attest:

EDWARD M. FLETCHER, JR.　　　ROBERT GOTTSCHALK
Attesting Officer　　　　　　　Commissioner of Patents